(12) United States Patent
Abraham et al.

(10) Patent No.: US 12,395,794 B2
(45) Date of Patent: Aug. 19, 2025

(54) CONFERENCING SYSTEMS AND METHODS FOR ROOM INTELLIGENCE

(71) Applicant: Shure Acquisition Holdings, Inc., Niles, IL (US)

(72) Inventors: Mathew T. Abraham, Colorado Springs, CO (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 323 days.

(21) Appl. No.: 17/934,148

(22) Filed: Sep. 21, 2022

(65) Prior Publication Data
US 2023/0086490 A1 Mar. 23, 2023

Related U.S. Application Data

(60) Provisional application No. 63/261,459, filed on Sep. 21, 2021.

(51) Int. Cl.
*H04R 5/04* (2006.01)
*H04N 23/695* (2023.01)
*H04R 5/027* (2006.01)

(52) U.S. Cl.
CPC ............ *H04R 5/04* (2013.01); *H04N 23/695* (2023.01); *H04R 5/027* (2013.01)

(58) Field of Classification Search
None
See application file for complete search history.

(56) References Cited

U.S. PATENT DOCUMENTS

| | | | |
|---|---|---|---|
| 5,206,721 | A | 4/1993 | Ashida |
| 5,686,957 | A | 11/1997 | Baker |
| 6,731,334 | B1 | 5/2004 | Maeng |
| 6,980,485 | B2 | 12/2005 | McCaskill |
| 7,305,095 | B2 | 12/2007 | Rui |
| 7,349,008 | B2 | 3/2008 | Rui |

(Continued)

FOREIGN PATENT DOCUMENTS

| | | |
|---|---|---|
| CN | 102843540 | 12/2012 |
| CN | 107809596 | 3/2018 |

(Continued)

OTHER PUBLICATIONS

Zhe Dong and Ming Yu, Research on TDOA Based Microphone Array Acoustic Localization, 2015 IEEE 12th Int'l Conf. on Electronic Measurement & Instruments 1077 (2015) (Year: 2015).*

(Continued)

*Primary Examiner* — Walter F Briney, III
(74) *Attorney, Agent, or Firm* — Neal, Gerber & Eisenberg LLP

(57) ABSTRACT

Conferencing systems and methods configured to generate true talker coordinates for use in camera tracking of talkers and objects in an environment and other room intelligence use cases are disclosed. The initial configuration and ongoing usage of conferencing systems can be improved by detecting and converting the locations of objects and talkers in an environment into a common coordinate system. The amount of time and effort by installers, integrators, and users, can be reduced leading to increased satisfaction with installation and usage of the conferencing system.

16 Claims, 10 Drawing Sheets

(56) References Cited

U.S. PATENT DOCUMENTS

| | | |
|---|---|---|
| 7,403,217 B2 | 7/2008 | Schulz |
| 7,487,056 B2 | 2/2009 | Tashev |
| 7,586,513 B2 | 9/2009 | Muren |
| 7,852,369 B2 | 12/2010 | Cutler |
| 8,189,807 B2 | 5/2012 | Cutler |
| 8,238,573 B2 | 8/2012 | Ishibashi |
| 8,248,448 B2 | 8/2012 | Feng |
| 9,030,520 B2 | 5/2015 | Chu |
| 9,179,098 B2 | 11/2015 | Buckler |
| 9,338,549 B2 | 5/2016 | Haulick |
| 9,350,940 B1 | 5/2016 | Baker |
| 9,392,221 B2 | 7/2016 | Feng |
| 9,489,948 B1 | 11/2016 | Chu |
| 9,633,270 B1 | 4/2017 | Tangeland |
| 9,674,453 B1* | 6/2017 | Tangeland ........... H04N 23/661 |
| 9,769,424 B2 | 9/2017 | Michot |
| 9,769,552 B2 | 9/2017 | Choisel |
| 9,980,040 B2 | 5/2018 | Whyte |
| 10,091,412 B1 | 10/2018 | Feng |
| 10,491,809 B2 | 11/2019 | Feng |
| 10,582,117 B1 | 3/2020 | Tanaka |
| 10,966,022 B1 | 3/2021 | Chu |
| 11,127,401 B2 | 9/2021 | Sarkar |
| 11,381,906 B2 | 7/2022 | Rollow, IV |
| 11,438,691 B2 | 9/2022 | Veselinovic |
| 11,601,731 B1 | 3/2023 | Slotznick |
| 11,695,900 B2 | 7/2023 | Childress, Jr. |
| 11,902,656 B2 | 2/2024 | Muthiah |
| 12,143,806 B2 | 11/2024 | McElveen et al. |
| 2005/0008169 A1 | 1/2005 | Muren |
| 2005/0140779 A1 | 6/2005 | Schulz |
| 2005/0283328 A1 | 12/2005 | Tashev |
| 2006/0005136 A1 | 1/2006 | Wallick |
| 2008/0037802 A1 | 2/2008 | Posa |
| 2009/0323981 A1 | 12/2009 | Cutler |
| 2011/0135125 A1 | 6/2011 | Zhan |
| 2011/0285809 A1 | 11/2011 | Feng |
| 2011/0317522 A1 | 12/2011 | Florencio et al. |
| 2012/0294118 A1 | 11/2012 | Haulick |
| 2013/0271559 A1 | 10/2013 | Feng |
| 2013/0300820 A1 | 11/2013 | Liu |
| 2014/0362163 A1 | 12/2014 | Winterstein |
| 2015/0146078 A1 | 5/2015 | Aarrestad |
| 2016/0277712 A1 | 9/2016 | Michot |
| 2017/0201825 A1 | 7/2017 | Whyte |
| 2018/0167581 A1* | 6/2018 | Goesnar ................. H04N 7/142 |
| 2018/0270451 A1* | 9/2018 | Dickins .................... H04N 7/15 |
| 2019/0158733 A1 | 5/2019 | Feng |
| 2020/0084366 A1* | 3/2020 | Fujiwara ................ H04R 3/005 |
| 2020/0351435 A1 | 11/2020 | Therkelsen |
| 2021/0051397 A1 | 2/2021 | Veselinovic |
| 2021/0097995 A1 | 4/2021 | Sarkar |
| 2021/0152930 A1 | 5/2021 | Bryans |
| 2021/0266680 A1* | 8/2021 | Frieding .............. H04R 25/407 |
| 2021/0345040 A1 | 11/2021 | Meyer |
| 2021/0360193 A1 | 11/2021 | Childress, Jr. |
| 2022/0201421 A1 | 6/2022 | McElveen |
| 2022/0353465 A1 | 11/2022 | Smith |
| 2023/0025997 A1 | 1/2023 | Liu |
| 2023/0053202 A1 | 2/2023 | Chu |
| 2023/0086490 A1 | 3/2023 | Abraham |
| 2024/0007744 A1 | 1/2024 | Muthiah |

FOREIGN PATENT DOCUMENTS

| | | |
|---|---|---|
| CN | 108063910 | 5/2018 |
| CN | 108370470 | 8/2018 |
| CN | 112311999 | 2/2021 |
| CN | 112689092 | 4/2021 |
| CN | 113099160 | 7/2021 |
| EP | 0765084 | 3/1997 |
| EP | 1705911 | 9/2006 |
| JP | H01180193 | 7/1989 |
| JP | H0314386 | 1/1991 |
| JP | H1042264 | 2/1998 |
| JP | 2000041228 | 2/2000 |
| JP | 3739673 | 1/2006 |
| JP | 2011193392 | 9/2011 |
| JP | 2020043456 | 3/2020 |
| KR | 101884446 | 8/2018 |
| KR | 102407872 | 6/2022 |
| WO | 2008047804 | 4/2008 |

OTHER PUBLICATIONS

Nishiura, et al., "Collaborative Steering of Microphone Array and Video Camera Toward Multi-lingual Tele-conference Through Speech-to-Speech Translation," IEEE Workshop on Automatic Speech Recognition and Understanding, 2001, 4 pp.

International Search Report and Written Opinion for PCT/US2022/076815 dated Jan. 5, 2023, 12 pp.

Legg, et al., "A Combined Microphone and Camera Calibration Technique with Application to Acoustic Imaging," IEEE Transactions on Image Processing, vol. 22, No. 10, pp. 4028-4039, Oct. 1, 2013, 12 pp.

Sharma, "The Ultimate Guide to K-Means Clustering: Definition, Methods and Applications," Analytics Vidhya, Nov. 3, 2023, 19 pp.

International Search Report and Written Opinion for PCT/US2023/030647 dated Nov. 9, 2023, 11 pp.

Lathoud, et al., "Short-Term Spatio-Temporal Clustering Applied to Multiple Moving Speakers," IEEE Transactions on Audio, Speech, and Language Processing, vol. 15, No. 5, Jul. 2007, 15 pp.

Thiergart, et al., "Localization of Sound Sources in Reverberant Environments Based on Directional Audio Coding Parameters," Audio Engineering Society Convention 127, New York, Oct. 2009, 14 pp.

International Search Report and Written Opinion for PCT/US2023/026753 dated Sep. 15, 2023, 13 pp.

Gabriel, et al., "Design and assessment of multiple-sound source localization using microphone arrays," Proceedings of the 2019 IEEE/SICE Intl. Symposium on System Integration, Jan. 2019, 6 pp.

Ronzhin, et al., "Audiovisual Speaker Localization in Medium Smart Meeting Room," IEEE ICICS 8th International Conference, Dec. 2011, 5 pp.

Aarabi, "The Fusion of Distributed Microphone Arrays for Sound Localization," EURASIP Journal on Applied Signal Processing, vol. 2003, No. 4, Jan. 2003, 10 pp.

Ishi, et al., "Speech activity detection and face orientation estimation using multiple microphone arrays and human position information," IEEE/RSJ Intl. Conference on Intelligent Robots and Systems, 2015, 6 pp.

Wang, et al., "Voice Source Localization for Automatic Camera Pointing System in Videoconferencing," 1997 IEEE International Conference on Acoustics, Speech, and Signal Processing, vol. 1, 4 pp.

DiBiase, et al., "Robust Localization in Reverberant Rooms," Microphone Arrays, 2001, 24 pp.

Ishi, et al., "Using multiple microphone arrays and reflections for 3D localization of sound sources," 2013 IEEE/RSJ International Conference on Intelligent Robots and Systems, 6 pp.

ATND1061DAN, Beamforming Array Microphone, User Manual, Audio-technica, 2022, 107 pp.

AVer Press Release, "AVer Partners with Sennheiser to Transform Video and Audio Collaboration," Nov. 18, 2021, 1 p.

AVer PTZ Link, User Manual, AVer Information Inc., 2022, 71 pp.

HDL300 System, Nureva Product Page, Downloaded from webpage <https://www.nureva.com/audio-conferencing/hdl300> on Dec. 4, 2024, 10 pp.

International Search Report and Written Opinion for PCT/US2024/036908 dated Nov. 13, 2024, 14 pp.

Introducing StreamSet, Audio-technica, Product Page, Downloaded from webpage <https://www.audio-technica.com/en-us/> on May 15, 2023, 7 pp.

Kuhn, "Adaptive Audio/Video Zone Creation in Online Meeting Environment," ip.com, Jun. 22, 2022, 5 pp.

Mitchell, "Poly Studio review: Take the pain out of videoconferencing," ITPro, Sep. 17, 2019, 9 pp.

(56) References Cited

OTHER PUBLICATIONS

MXA920 Command Strings, Shure, User Manual, 2024, 41 pp.
Vissonic Audio Solutions, Array Microphone Conference Solution, Downloaded from <https://www.vissonic.com/solution/220.html> on Dec. 4, 2024, 7 pp.
Webex Help Center, "Differences between the presenter and the audience, briefing room, and classroom setups," Downloaded from website <https://help.webex.com/en-us/article/n4522teb/Set-up-classroom-on-Room-Series> on Feb. 11, 2025, 15 pp.
Yealink, MeetingEye 800, 4K UHD Video Conferencing Endpoint, Information Sheet, 2022, 4 pp.

* cited by examiner

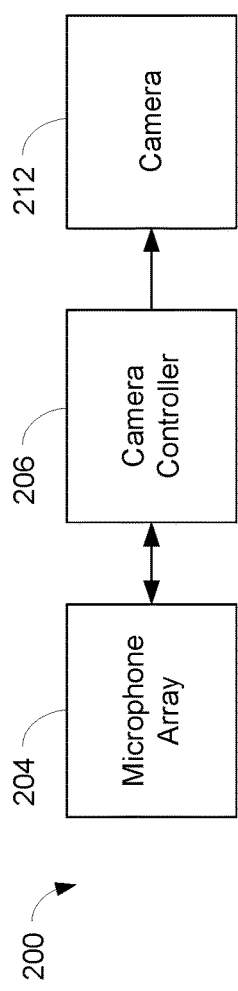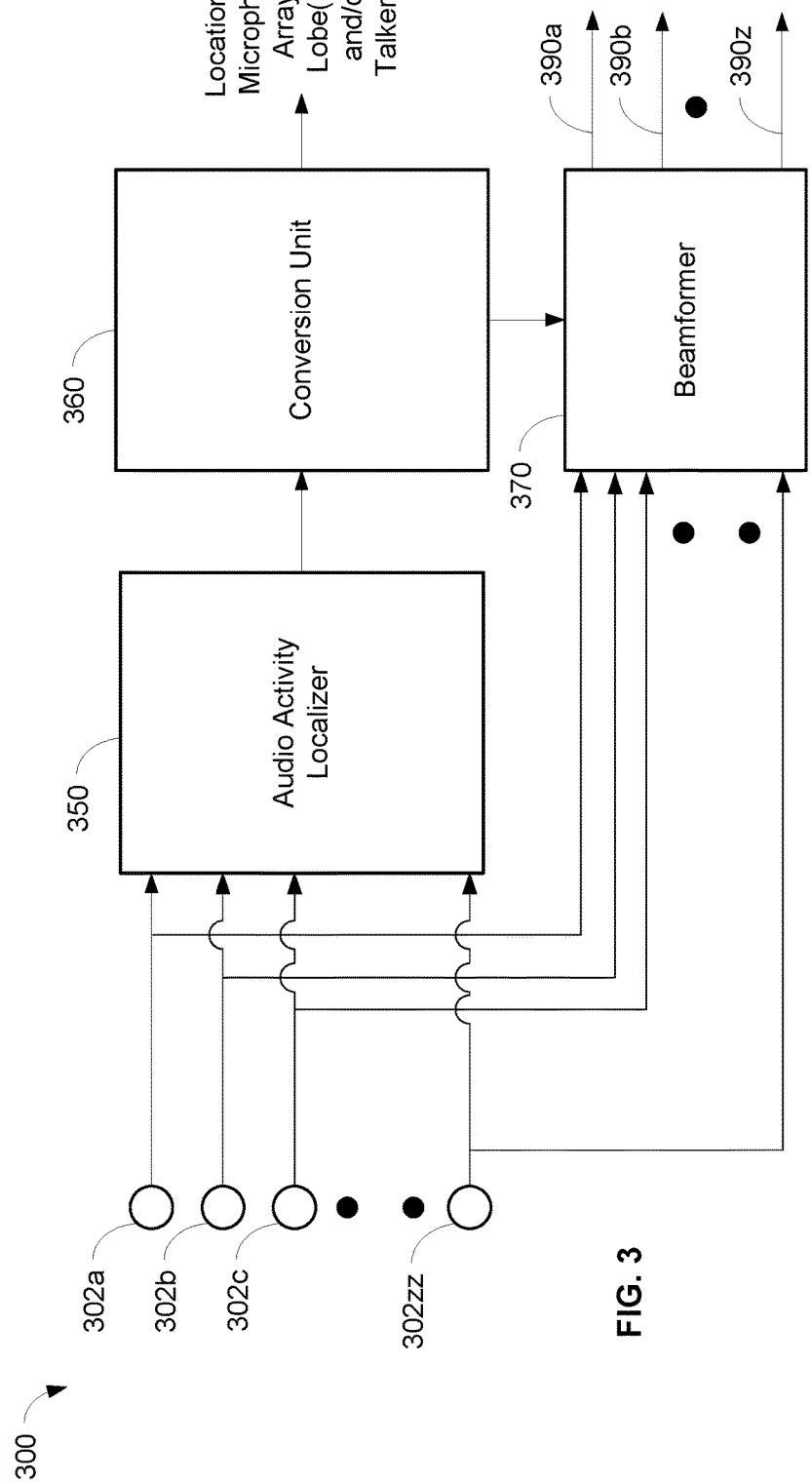

CONFERENCING SYSTEMS AND METHODS FOR ROOM INTELLIGENCE

CROSS-REFERENCE TO RELATED APPLICATION

This application claims the benefit of U.S. Provisional Patent Application No. 63/261,459, filed Sep. 21, 2021, and is fully incorporated by reference in its entirety herein.

TECHNICAL FIELD

This application generally relates to conferencing systems and methods configured to generate true talker coordinates for use in camera tracking of talkers and objects in an environment and other room intelligence use cases.

BACKGROUND

Conferencing environments, such as conference rooms, boardrooms, video conferencing settings, and the like, can involve the use of microphones (including microphone arrays) for capturing sound from audio sources and loudspeakers for presenting audio from a remote location (also known as a far end). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

Such conferencing environments may also include one or more image capture devices, such as cameras, which can be used to capture and provide images and video of persons and objects in the environment to be transmitted for viewing at the remote location. However, it may be difficult for the viewers at the remote location to see particular talkers if, for example, the camera in an environment is configured to only show the entire room or if the camera is fixed to show only a specific pre-configured portion of the room. Talkers may include, for example, humans in the environment that are speaking or making other sounds.

In addition, there may be environments where multiple cameras and/or multiple microphones are desirable for adequate video and audio coverage, and where the relative positions of the cameras and microphone are not known or pre-defined. In such environments, it may be difficult to accurately correlate camera angles with talker positions. While a professional installer or integrator may manually configure zones or presets for cameras based on location information from a microphone array, this is often a time-consuming, laborious, and inflexible process. For example, if a seating arrangement in a room is changed after an initial setup of a system, pre-configured camera zones may not adequately cover the participants, and such zones may be difficult to modify after they are set up, and/or may only be modified by a professional installer or integrator.

SUMMARY

The techniques of this disclosure are directed to solving the above-noted problems by providing systems and methods that are designed to, among other things: (1) determine a camera location in a first coordinate system using a microphone array, convert the camera location using the microphone array into a microphone array location in a second coordinate system, and transmit the microphone array location in the second coordinate system to the camera; (2) convert lobe locations of the microphone array in the first coordinate system into lobe locations in the second coordinate system, and transmit the lobe locations in the second coordinate system to the camera; (3) convert talker locations detected by the microphone array in the first coordinate system into talker locations in the second coordinate system, and transmit the talker locations in the second coordinate system to the camera; (4) aggregate and convert microphone array locations, lobe locations, and talker locations from multiple microphone arrays in respective coordinate systems into another coordinate system, and transmit the microphone array locations, lobe locations, and talker locations in the other coordinate system to the camera; and (5) generate camera presets or adjust a camera based on lobe locations and/or talker locations that are in a converted coordinate system.

In an embodiment, a method may include detecting, using a microphone array and based on an acoustical trigger from or near a camera, a camera location in a first coordinate system; converting, using the microphone array and based on the camera location, the camera location in the first coordinate system into a microphone array location in a second coordinate system; and transmitting, from the microphone array to the camera, the microphone array location in the second coordinate system.

In another embodiment, a method may include receiving, with a camera, one or more microphone lobe locations in a coordinate system with respect to the camera; receiving, with the camera, microphone lobe activity information indicating which of one or more microphone lobes associated with the one or more microphone lobe locations is active; automatically generating, using the camera and based on the one or more microphone lobe locations, one or more camera presets in the coordinate system with respect to the camera; determining, using the camera and based on the one or more camera presets and the microphone lobe activity information, an active preset of the one or more camera presets; and controlling the camera based on the determined active preset.

In a further embodiment, a method may include receiving, at a camera, one or more microphone lobe locations in a coordinate system with respect to the camera; automatically determining, using the camera and based on the one or more microphone lobe locations, an adjustment to at least one parameter associated with the camera; and controlling the camera based on the determined adjustment.

In another embodiment, a system may include a microphone array configured to detect a camera location in a first coordinate system based on an acoustical trigger from or near the camera; convert the camera location in the first coordinate system into a microphone array location in a second coordinate system; and transmit, to the camera, the microphone array location in the second coordinate system. The system may also include the camera being configured to receive the microphone array location in the second coordinate system; automatically generate, based on the microphone array location, one or more camera presets in the second coordinate system; and adjust a parameter of the camera based on the one of the one or more camera presets.

In a further embodiment, a method may include converting, using a microphone array, a lobe location of the microphone array in a first coordinate system into a lobe location of the microphone array in a second coordinate system; and transmitting, from the microphone array to a camera, the lobe location of the microphone array in the second coordinate system to cause the camera to adjust at least one parameter associated with the camera.

In another embodiment, a method may include determining, using a microphone array and based on audio associated with a talker, a talker location in a first coordinate system; converting, using the microphone array and based on the talker location in the first coordinate system, the talker location into a talker location in a second coordinate system; and transmitting, from the microphone array to a camera, the talker location in the second coordinate system to cause the camera to adjust at least one parameter associated with the camera.

In a further embodiment, a system may include a first audiovisual device, and a second audiovisual device that is not co-located with the first audiovisual device. The first audiovisual device may be configured to determine a location of the second audiovisual device in a first coordinate system that is relative to the first audiovisual device; and convert the location of the second audiovisual device in the first coordinate system into a location of the first audiovisual device in a second coordinate system that is relative to the second audiovisual device.

In another embodiment, a method may include determining, using a first audiovisual device and based on received audio, a second audiovisual device location in a first coordinate system; converting, based on the second audiovisual device location, the second audiovisual device location in the first coordinate system into a first audiovisual device location in a second coordinate system; and transmitting, from the first audiovisual device to the second audiovisual device, the first device location in the second coordinate system.

In a further embodiment, a method may include detecting, using each of a plurality of cameras, a microphone location in respective coordinate systems of the plurality of cameras; converting the microphone locations in the respective coordinate systems of the plurality of cameras into the microphone location in a common coordinate system; and controlling a parameter of one or more of the plurality of cameras, based on the microphone location in the common coordinate system.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 2 is a block diagram of a system that is usable with the conferencing system of FIG. 1, in accordance with some embodiments.

FIG. 3 is a block diagram of a microphone array configured for automated detection of audio activity and conversion of the locations of objects and talkers in an environment into a coordinate system, and that is usable with the systems of FIGS. 1 and 2, in accordance with some embodiments.

DETAILED DESCRIPTION

The systems and methods described herein can improve the configuration and usage of conferencing systems by detecting and converting the locations of objects and talkers in the environments into a common coordinate system. For example, a microphone array can detect and convert the location of a camera in a coordinate system with respect to the microphone array into a location of the microphone array in a coordinate system that is more readily usable by the camera, e.g., a coordinate system with respect to the camera. As another example, the microphone array can detect the locations of talkers in the environment in a coordinate system with respect to the microphone array. The microphone array can also convert the locations of talkers in the coordinate system with respect to the microphone array into the locations of the talkers in a coordinate system with respect to the camera. As a further example, the microphone array can convert the locations of lobes of the microphone array that are in a coordinate system with respect to the microphone array into the locations of lobes in the coordinate system with respect to the camera.

In this way, the camera can receive the locations of the microphone array, talkers, and/or microphone array lobes in a coordinate system that is understandable and useful to the camera. The systems and methods described herein may be particularly useful for use with conferencing systems where the positions of the camera and the microphone array are not initially known relative to each other, e.g., where the camera and the microphone array are not co-located.

The camera can utilize the locations of the microphone array, talkers, and/or microphone array lobes, for example, as the basis for generating camera presets that may be based on the locations of talkers and/or microphone lobes. The camera can also utilize the locations of the microphone array, talkers, and/or microphone array lobe for moving, zooming, panning, framing, or otherwise adjusting the image and video captured by the camera. As such, the systems and methods described herein can be helpful during configuration of the conferencing system in order to reduce manual measurements that may typically performed by an installer or integrator, such as measurements of the distance and location between the camera and the microphone array. The systems and methods described herein can also be helpful during usage of the conferencing system to enable the camera to more accurately capture the image of active talkers, for example. Accordingly, the amount of time and effort by installers, integrators, and users can be reduced, leading to increased satisfaction with the installation and usage of the conferencing system.

Figure 1:
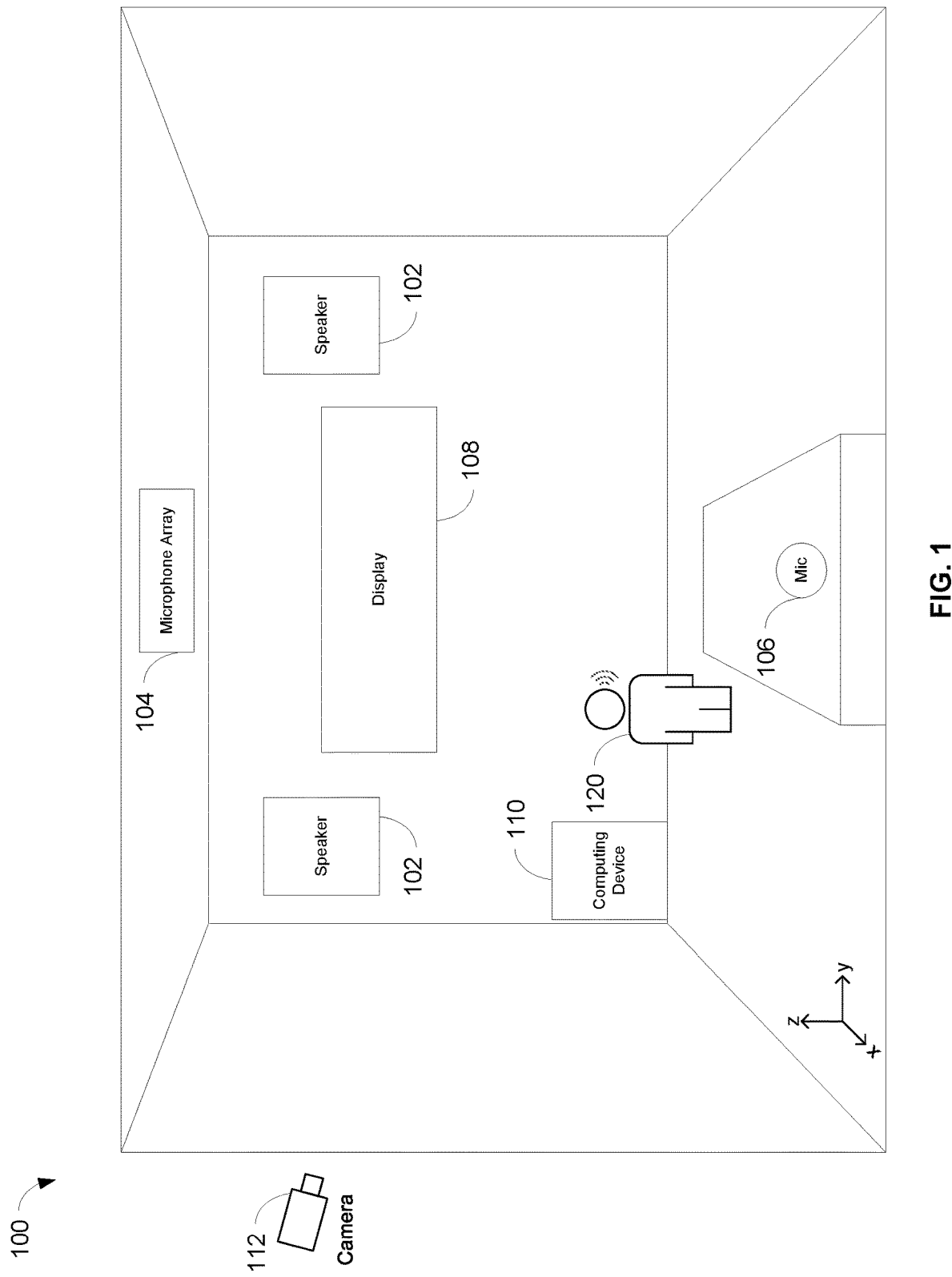
FIG. 1 is an exemplary depiction of a physical environment including a conferencing system that can be utilized to detect and convert the locations of objects and talkers in an environment into a coordinate system, in accordance with some embodiments.

FIG. 1 is an exemplary depiction of a physical environment 100 in which the systems and methods disclosed herein may be used. In particular, FIG. 1 shows a perspective view of an exemplary conference room including various transducers and devices of a conferencing system, as well as other objects. It should be understood that while FIG. 1 illustrates one potential environment, the systems and methods disclosed herein may be utilized in any applicable environment, including but not limited to offices, huddle rooms, theaters, arenas, music venues, etc.

The system in the environment 100 shown in FIG. 1 may include various components, such as loudspeakers 102, a microphone array 104, a tabletop microphone 106, a display 108, a computing device 110, and a camera 112. The environment 100 may also include one or more persons 120 and/or other objects (e.g., musical instruments, phones, tablets, computers, HVAC equipment, etc.). In embodiments, one or more of the components may include a digital signal processor, wireless receivers, wireless transceivers, etc. It should be understood that the components shown in FIG. 1 are merely exemplary, and that any number, type, and placement of the various components in the environment 100 are contemplated and possible.

The types of transducers (e.g., microphones and loudspeakers) and their placement in a particular environment may depend on the locations of the audio sources, listeners, physical space requirements, aesthetics, room layout, stage layout, and/or other considerations. For example, microphones may be placed on a table or lectern near the audio sources, such as the microphone 106, or attached to the audio sources, e.g., a performer. Microphones may also be mounted overhead or on a wall to capture the sound from a larger area, such as an entire room, e.g., using the microphone array 104. Similarly, the loudspeakers 102 may be placed on a wall or ceiling in order to emit sound to listeners in the environment 100, such as sound from the far end of a conference, pre-recorded audio, streaming audio, etc. Microphones and loudspeakers may conform to a variety of sizes, form factors, mounting options, and wiring options to suit the needs of particular environments.

Typically, the conference room of the environment 100 may be used for meetings where local participants communicate with each other and/or with remote participants. As such, the microphone array 104 and/or the tabletop microphone 106 can detect and capture sounds from audio sources within the environment 100. The audio sources may be one or more human talkers 120, for example. In a common situation, human talkers may be seated in chairs at a table, although other configurations and locations of the audio sources are contemplated and possible.

The camera 112 may capture still images and/or video of the environment 100 where the system is located. In some embodiments, the camera 112 may be a standalone camera, and in other embodiments, the camera 112 may be a component of an electronic device, e.g., smartphone, tablet, etc. The camera 112 may be a pan-tilt-zoom (PTZ) camera that can physically move and zoom to capture desired images and video, or may be a virtual PTZ camera that can digitally crop and zoom images and videos into one or more desired portions. The display 108 may be a television or computer monitor, for example, and may show other images and/or video, such as the remote participants of a conference or other image or video content. In embodiments, the display 108 may include microphones and/or loudspeakers.

FIG. 2 shows a block diagram of a system 200 that is usable with the conferencing system shown in the environment 100 of FIG. 1. The system 200 may include a microphone array 204 (e.g., microphone array 104 of FIG. 1) that can detect and convert the locations of objects and talkers in the environment 100 into a common coordinate system that is readily usable by a camera 212 (e.g., camera 112 of FIG. 1) that may be controlled by a camera controller 206, in embodiments. The camera controller 206 may provide appropriate signals to the camera 212 to cause the camera 212 to move and/or zoom, for example. The camera controller 206 may also be configured to generate camera presets, as described in more detail below with respect to FIGS. 6-7. In some embodiments, the camera controller 206 and the camera 212 may be integrated together. The components of the system 200 may be in wired and/or wireless communication with the other components of the system 200. In embodiments, the conversion of the locations of objects and talkers in the environment 100 into a common coordinate system may be performed, for example, by the camera controller 206, the camera 212, a computing device (e.g., computing device 110), a remote computing device (e.g., a cloud-based device), and/or any other suitable device.

The microphone array 204 may detect and capture sounds from audio sources within an environment. For example, in an embodiment described in more detail below with respect to the process 400 of FIG. 4, the microphone array 204 may detect a sound associated with the camera 212 and determine the location of the camera 212 in a coordinate system with respect to the microphone array 204, e.g., where the microphone array 204 is the origin of the coordinate system. The microphone array 204 may convert the location of the camera 212 into a location of the microphone array 204 in a coordinate system with respect to the camera 212, e.g., where the camera 212 is the origin of the coordinate system. The location of the microphone array 204 in the coordinate system with respect to the camera 212 can be transmitted from the microphone array 204 to the camera controller 206 and/or to the camera 212. For example, the microphone array 204 may communicate with the camera controller 206 and/or the camera 212 via a suitable application programming interface (API).

In embodiments, the location of the camera 212 in a coordinate system may be received by the microphone array 204 from another source, such as from a local positioning system, conferencing system configuration and design software, and/or the camera 212. In such embodiments, the location of the camera 212 in the coordinate system it is received in may be converted into the location of the microphone array 204 in a coordinate system with respect to the camera 212.

The microphone array 204 may be capable of forming one or more pickup patterns with lobes that can be steered to sense audio in particular locations within an environment. The microphone array 204 can convert lobe locations of the microphone array 204 from the coordinate system with respect to the microphone array 204 into the coordinate system with respect to the camera 212. The lobe locations of the microphone array 204 in the coordinate system with respect to the camera 212 can also be transmitted from the microphone array 204 to the camera controller 206 and/or to the camera 212.

As another example, in an embodiment described in more detail below with respect to the process 500 shown in FIG. 5, the microphone array 204 may detect a sound associated with a talker (or other desired audio source) in the environment and determine the location of the talker in a coordinate system with respect to the microphone array 204. The microphone array 204 may convert the location of the talker, e.g., talker 120, from the coordinate system with respect to the microphone array 204 into a location of the talker in a coordinate system with respect to the camera 212. The location of the talker in the coordinate system with respect to the camera 212 can be transmitted from the microphone array 204 to the camera controller 206 and/or to the camera 212.

In embodiments, the microphone array 204 and the camera controller 206 may communicate via a suitable application programming interface (API), including enabling the camera controller 206 to query the microphone array 204 for the location of the microphone array 204, enabling the microphone array 204 to transmit signals to the camera controller 206, and/or enabling the camera controller 206 to transmit signals to the microphone array 204. The camera controller 206 may utilize the locations of the microphone array 204, lobes, and/or talkers that are in the coordinate system with respect to the camera 212 in order to, for example, generate optimized camera presets to allow more accurate zooming, panning, and/or framing of the talkers.

Some or all of the components of the system 200 may be implemented using software executable by one or more computers, such as computing device 110 of FIG. 1 having a processor and memory (e.g., a personal computer (PC), a laptop, a tablet, a mobile device, a smart device, thin client, etc.), and/or by hardware (e.g., discrete logic circuits, application specific integrated circuits (ASIC), programmable gate arrays (PGA), field programmable gate arrays (FPGA), digital signal processors (DSP), microprocessor, etc.). For example, some or all components of the system 200 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 4-8. Thus, in embodiments, the system 200 may include one or more processors, memory devices, computing devices, and/or other hardware components not shown in FIG. 2.

It should be understood that the components shown in FIG. 2 are merely exemplary, and that any number, type, and placement of the various components of the system 200 are contemplated and possible. For example, there may be multiple microphone arrays 204, multiple camera controllers 206, and/or multiple cameras 212.

FIG. 3 shows a block diagram of a microphone array 300, such as the microphone array 204 of FIG. 2, that is usable in the system 200 of FIG. 2 for detecting sounds from audio sources in an environment, and converting the locations of objects and talkers in an environment into a common coordinate system that is readily usable by a camera. The microphone array 300 may include any number of microphone elements 302$a, b, c, \ldots, zz$, for example, and be able to form one or more pickup patterns with lobes so that the sound from the audio sources can be detected and captured. Each of the microphone elements 302$a, b, c, \ldots, zz$ in the microphone array 300 may detect sound and convert the sound to an analog audio signal. The microphone array 300 may also include an audio activity localizer 350 in wired or wireless communication with the microphone elements 302$a, b, c, \ldots, zz$, a conversion unit 360 in wired or wireless communication with the audio activity localizer 350, and a beamformer 370 in wired or wireless communication with the microphone elements 302$a, b, c, \ldots, zz$ and the audio activity localizer 350.

The microphone elements 302$a, b, c, \ldots, zz$ may each be a MEMS (micro-electrical mechanical system) microphone with an omnidirectional pickup pattern, in some embodiments. In other embodiments, the microphone elements 302$a, b, c, \ldots, zz$ may have other pickup patterns and/or may be electret condenser microphones, dynamic microphones, ribbon microphones, piezoelectric microphones, and/or other types of microphones. In embodiments, the microphone elements 302$a, b, c, \ldots, zz$ may be arrayed in one dimension or multiple dimensions.

Other components in the microphone array 300, such as analog to digital converters, processors, and/or other components (not shown), may process the analog audio signals and ultimately generate one or more digital audio output signals. The digital audio output signals may conform to suitable standards and/or transmission protocols for transmitting audio. In embodiments, each of the microphone elements in the microphone array 300 may detect sound and convert the sound to a digital audio signal.

One or more digital audio output signals 390$a, b, \ldots, z$ may be generated corresponding to each of the pickup patterns. The pickup patterns may be composed of one or more lobes, e.g., main, side, and back lobes, and/or one or more nulls. The pickup patterns that can be formed by the microphone array 300 may be dependent on the type of beamformer used with the microphone elements, such as beamformer 370. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern.

The audio activity localizer 350 may determine the location of audio activity in an environment based on the audio signals from the microphone elements 302$a, b, c, \ldots, zz$. In embodiments, the audio activity localizer 350 may utilize a Steered-Response Power Phase Transform (SRP-PHAT) algorithm, a Generalized Cross Correlation Phase Transform (GCC-PHAT) algorithm, a time of arrival (TOA)-based algorithm, a time difference of arrival (TDOA)-based algorithm, or another suitable sound source localization algorithm. The audio activity that is detected may include audio sources, such as human talkers or an acoustical trigger from or near camera, e.g., camera 212. The location of the audio activity may be indicated by a set of three-dimensional coordinates relative to the location of the microphone array 300, such as in Cartesian coordinates (i.e., x, y, z), or in spherical coordinates (i.e., radial distance/magnitude r, elevation angle θ (theta), azimuthal angle φ (phi)). It should be noted that Cartesian coordinates may be readily converted to spherical coordinates, and vice versa, as needed. In embodiments, the audio activity localizer 350 may be included in the microphone array 300, may be included in another component, or may be a standalone component.

The conversion unit 360 may receive the location of audio activity from the audio activity localizer 350, and convert the location of the audio activity from the coordinate system relative to the microphone array 300 to another coordinate system. For example, the location of the audio activity may be converted by the conversion unit 360 into a location of the audio activity in a coordinate system relative to a camera, e.g., camera 212. In embodiments, the location of a camera in the coordinate system relative to the microphone array 300 (as determined from a detected acoustical trigger from or near the camera) can be converted by the conversion unit 360 into the location of the microphone array 300 in the coordinate system relative to the camera.

The conversion unit 360 may also be configured to convert the location of lobes of the microphone array 300 that are in the coordinate system relative to the microphone array 300 to another coordinate system. The conversion unit 360 may transmit the locations of the audio activity and/or lobes that have been converted to the other coordinate system, such as to the camera controller 206 and/or the camera 212.

Figure 4:
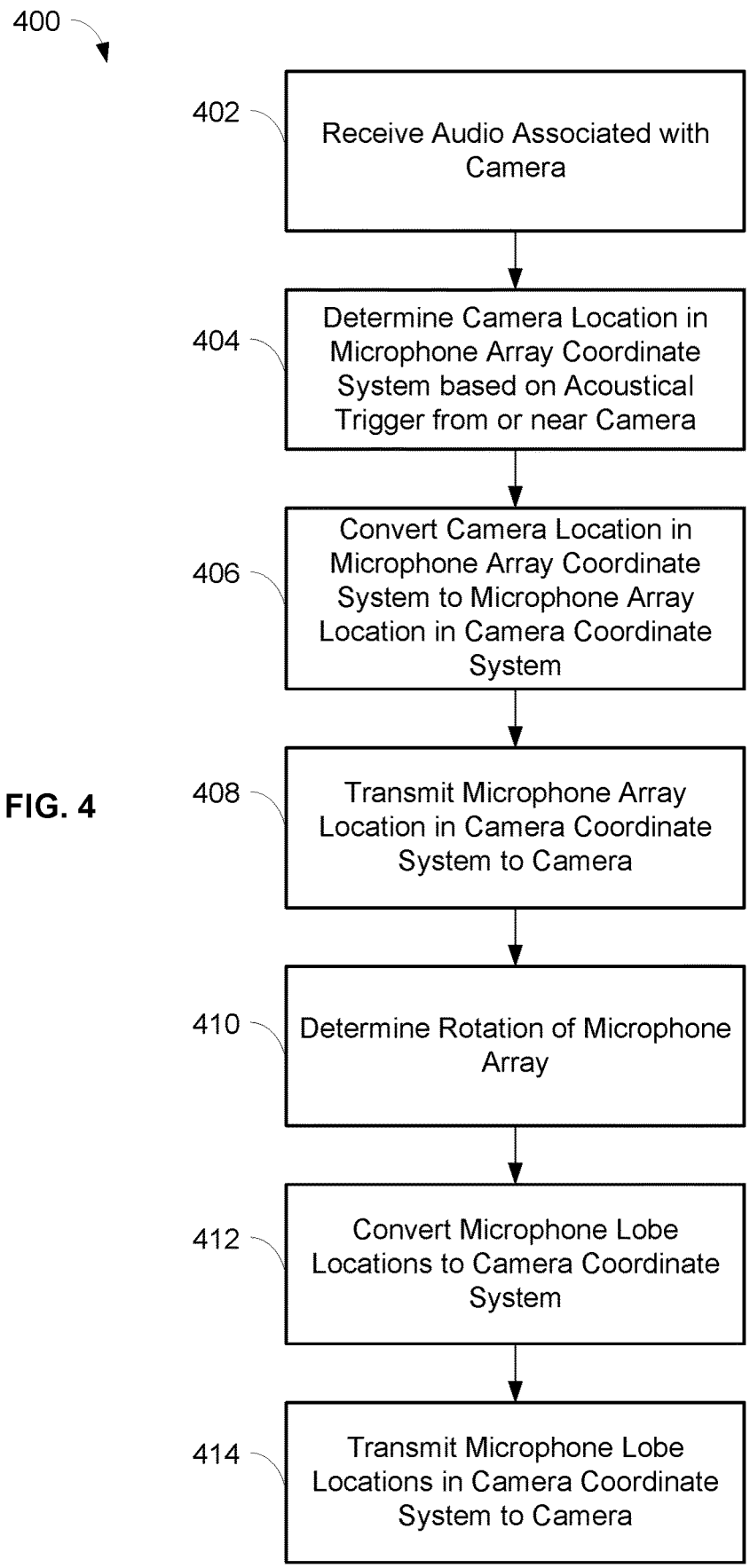
FIG. 4 is a flowchart illustrating operations for determining and converting a camera location in a first coordinate system into a microphone array location in a second coordinate system, and converting microphone lobe locations to the second coordinate system, using the systems of FIGS. 2 and 3, in accordance with some embodiments.

FIG. 4 shows a process 400 for a microphone array, e.g., microphone array 300, to determine and convert a camera location in a first coordinate system, e.g., relative to the microphone array, into a microphone array location in a second coordinate system, e.g., relative to the camera. The process 400 may also include the microphone array converting microphone lobe locations to the second coordinate system. The process 400 may result in transmitting the microphone array location and/or microphone lobe locations in the second coordinate system from the microphone array 300 to camera 212 or another component. For example, the camera 212 may utilize the microphone array location and/or microphone lobe locations that are in the coordinate system relative to the camera 212 to generate camera presets and/or for adjusting parameters associated with the camera 212 (e.g., to zoom in on the location covered by a lobe), such as described in more detail below with respect to the process 600 of FIG. 6. As another example, the microphone array location and/or microphone lobe locations that are in the coordinate system relative to the camera 212 may be utilized to assist with room intelligence use cases, such as room mapping applications, e.g., generating a computer-aided design representation of a room. In embodiments, the process 400 may be utilized to determine the location of objects and devices within a room.

At step 402, an acoustical trigger from or near the camera 212 can be received at the microphone array 300, such as by being detected by microphone elements 302a, b, c, . . . , zz. The acoustical trigger from or near the camera 212 may include one or more sounds that are intended to be used to determine the location of the camera 212. For example, a sound may be made in front of the camera 212, such as a finger snap, when it is desired for the microphone array 300 to determine the location of the camera 212. As another example, the camera 212 may be configured to emit an identifying sound, such as a known tonal sequence, when it is desired for the microphone array 300 to automatically determine the location of the camera 212. In embodiments, the microphone array 300 may be placed into a particular mode by a user (e.g., installer or integrator) when it is desired to determine the location of the camera 212. When placed in such a mode, the microphone array 300 will expect that the next detected sounds should be the acoustical trigger from or near the camera 212 for the purpose of determining the location of the camera 212.

At step 404, the audio activity localizer 350 may determine a location of the camera 212 based on the acoustical trigger from or near the camera 212 that was received at step 402. In embodiments, the audio activity localizer 350 may execute an audio localization algorithm on the received acoustical trigger from or near the camera 212 to determine the location of the camera 212. The location of the camera 212 that is determined at step 404 may be in a coordinate system relative to the microphone array 300. The audio activity localizer 350 may transmit the location of the camera 212 to the conversion unit 360.

At step 406, the conversion unit 360 may convert the location of the camera 212 that is in the coordinate system relative to the microphone array 300 into a location of the microphone array 300 that is in a coordinate system relative to the camera 212. At step 408, the conversion unit 360 may transmit to the camera 212 the location of the microphone array 300 that is in a coordinate system relative to the camera 212.

In embodiments, the locations of lobes of the microphone array 300 may also be converted by the conversion unit 360 into the coordinate system relative to the camera 212. The converted locations of the lobes of the microphone array 300 may be transmitted to the camera 212. At step 410, the rotation of the microphone array 300 and the microphone elements 302a, b, c, . . . , zz may be determined, in some embodiments, in order to convert the locations of the lobes of the microphone array 300 into the coordinate system relative to the camera 212.

At step 412, the conversion unit 360 may convert the locations of the lobes of the microphone array 300 that are in the coordinate system relative to the microphone array 300 into locations of the lobes of the microphone array 300 that are in the coordinate system relative to the camera 212. The conversion of the locations of the lobes of the microphone array 300 into the coordinate system relative to the camera 212 may be based on the rotation of the microphone array 300 as determined at step 410, in some embodiments. In such embodiments, the rotation of the microphone array 300 may be taken into account to correct the locations of the lobes when performing the conversion at step 412. In other embodiments, the conversion of the locations of the lobes of the microphone array 300 into the coordinate system relative to the camera 212 may be not be based on the rotation of the microphone array 300.

In some embodiments, the locations of the lobes of the microphone array 300 that are currently active may be converted into the coordinate system relative to the camera 212, while in other embodiments, the locations of all the lobes of the microphone array 300 may be converted into the coordinate system relative to the camera 212. At step 414, the conversion unit 360 may transmit to the camera 212 the locations of the lobes of the microphone array 300, as generated at step 412, that are in the coordinate system relative to the camera 212.

Figure 14:
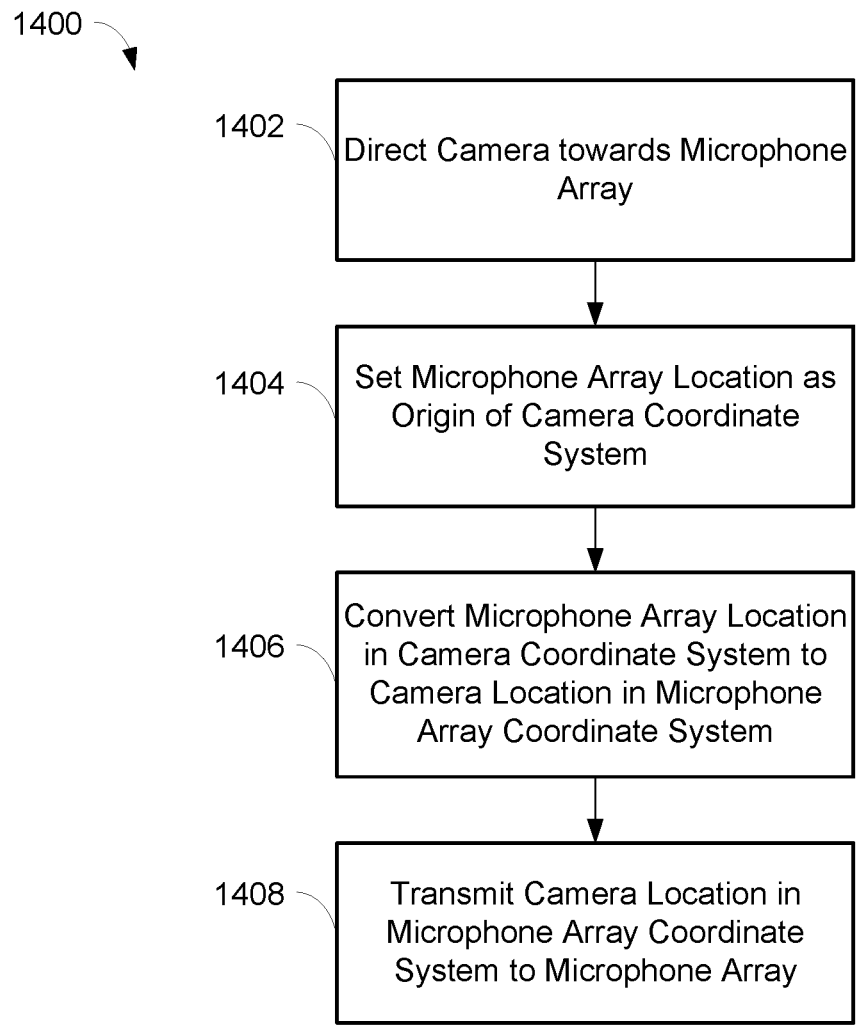
FIG. 14 is a flowchart illustrating operations for determining and converting a microphone array location in a first coordinate system into a camera location in a second coordinate system, in accordance with some embodiments.

FIG. 14 shows a process 1400 for a camera, e.g., camera 212, to determine and convert a microphone array location in a first coordinate system, e.g., relative to the camera, into a camera location in a second coordinate system, e.g., relative to the microphone array. The process 1400 may result in transmitting the camera location in the second coordinate system from the camera 212 to the microphone array 300 or another component. For example, the microphone array 300 may utilize the camera location to improve the accuracy of the location of the camera 212 that may have been determined using the process 400 described above.

At step 1402, the camera 212 may be directed to point at the microphone array 300, such as towards the center of the microphone array 300. For example, a user, installer, integrator, etc. may direct the camera 212 to point at the microphone array 300 at step 1402, such as via the camera controller 206. At step 1404, the camera 212 may set the location of the microphone array 300 as the origin of the coordinate system relative to the camera 212.

At step 1406, the location of the microphone array 300 that is in the coordinate system relative to the camera 212 (i.e., the origin of the coordinate system relative to the camera 212) may be converted by the camera 212 into a location of the camera 212 that is in a coordinate system relative to the microphone array 300. At step 1408, the camera 212 may transmit to the microphone array 300 the location of the camera 212 that is in a coordinate system relative to the microphone array 300.

Based on the location of the camera 212 that is in a coordinate system relative to the microphone array 300 as received at step 1408, the microphone array 300 may be able to more precisely convert a location of a talker that is in the coordinate system relative to the microphone array 300 into a location of the talker in a coordinate system relative to the camera 212 (such as at step 506 in the process 500 described below). This conversion of talker coordinates may be improved to be more precise by using the process 1400 since the microphone array 300 knows both the origin of the coordinate system relative to the camera 212 (i.e., the location of the microphone array 300 itself) and also the location of the camera 212 in the coordinate system relative to the microphone array 300.

Figure 5:
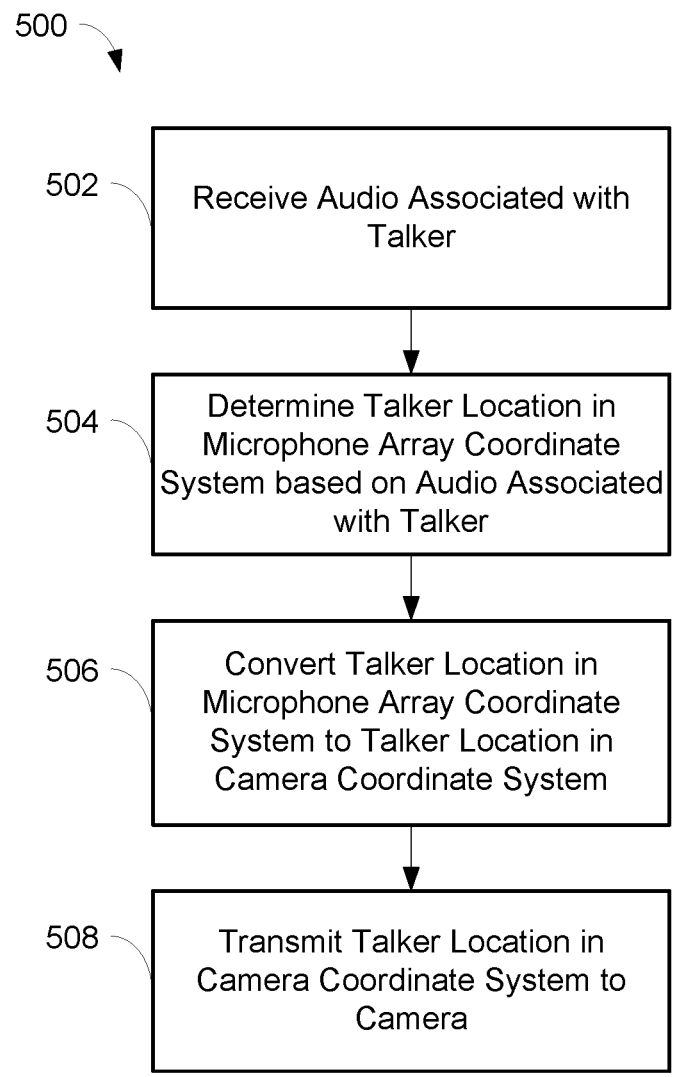
FIG. 5 is a flowchart illustrating operations for determining and converting talker locations detected by the microphone array in a first coordinate system into talker locations in a second coordinate system using the systems of FIGS. 2 and 3, in accordance with some embodiments.

FIG. 5 shows a process 500 for a microphone array, e.g., microphone array 300, to determine and convert a talker location in a first coordinate system, e.g., relative to the microphone array, into a talker location in a second coordinate system, e.g., relative to the camera. The process 500 may result in transmitting the converted talker location from the microphone array 300 to camera 212 or another component. For example, the camera 212 may utilize the converted talker location that is in the coordinate system relative to the camera 212 to generate camera presets, such as described in more detail below with respect to the process 700 of FIG. 7. As another example, the camera 212 may utilize the converted talker location that is in the coordinate system relative to the camera 212 to adjust parameters associated with the camera 212 (e.g., to zoom in on an active talker in the environment), such as described in more detail below with respect to the process 800 of FIG. 8.

In embodiments, the locations of other desired audio sources and objects in an environment may be determined using the process 500. For example, the location of persons, tables, chairs, and electronic equipment in a conference room may be mapped based on audio associated with such objects. The locations of objects in an environment can be analyzed to determine usage and occupancy information of rooms, for example.

At step 502, audio associated with a talker (or other desired sound) in the environment can be received at the microphone array 300, such as by being detected by microphone elements 302*a, b, c, . . . , zz*. At step 504, the audio activity localizer 350 may determine a location of the talker based on the audio associated with the talker that was received at step 502. In embodiments, the audio activity localizer 350 may execute an audio localization algorithm on the received audio associated with the talker to determine the location of the talker. The location of the talker that is determined at step 504 may be in a coordinate system relative to the microphone array 300. The audio activity localizer 350 may transmit the location of the talker to the conversion unit 360.

At step 506, the conversion unit 360 may convert the location of the talker that is in the coordinate system relative to the microphone array 300 into a location of the talker in a coordinate system relative to the camera 212. In embodiments, the rotation of the microphone array 300 may be taken into account to correct the locations of the talker when performing the conversion at step 506. At step 508, the conversion unit 360 may transmit to the camera 212 the location of the talker that is in a coordinate system relative to the camera 212.

Figure 6:
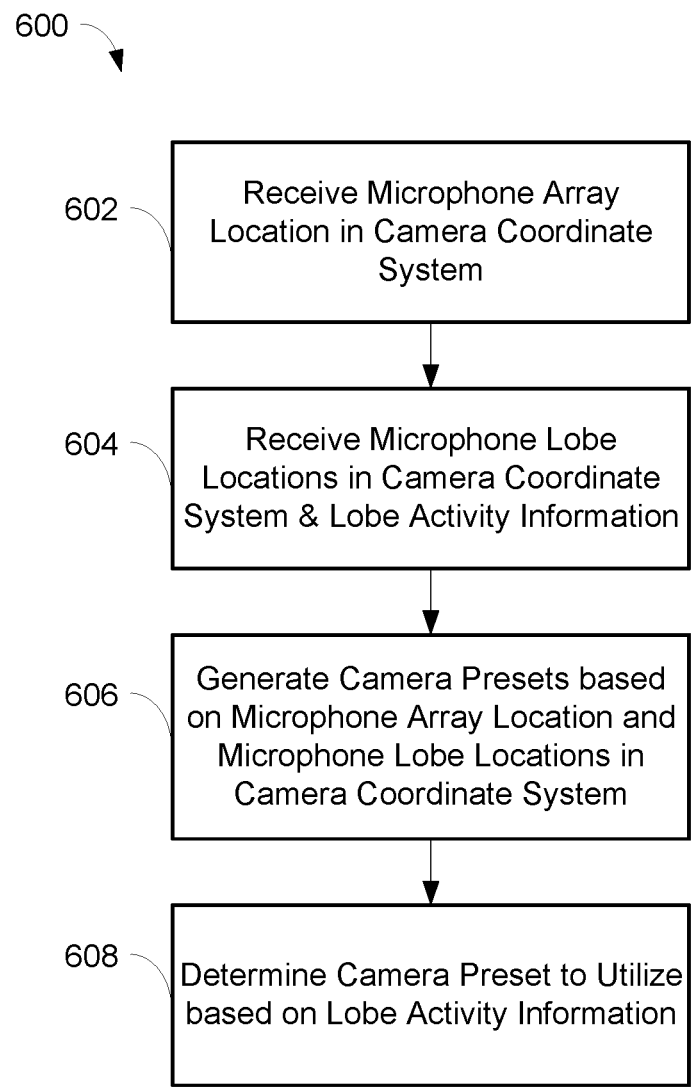
FIG. 6 is a flowchart illustrating operations for generating camera presets using a camera based on a microphone array location and lobe locations in a coordinate system using the systems of FIGS. 2 and 3, in accordance with some embodiments.

FIG. 6 shows a process 600 for a camera, e.g., camera 212, to generate camera presets based on a microphone array location and/or lobe locations that are in a coordinate system relative to the camera. In embodiments, a microphone array 300 may have converted the locations of the microphone array 300 and the lobes of the microphone array 300 from a coordinate system relative to the microphone array 300 to the coordinate system relative to the camera 212.

Camera presets may correspond to specific views of the camera 212, such as a view of a particular location and/or a zoom setting that would capture a portion of the environment where the camera 212 is situated. In embodiments, the camera presets may comprise settings for angle, tilt, zoom, and/or framing of images and/or video captured by the camera 212. For example, the camera presets generated by the process 600 may be set to capture images and/or video of one or more of the locations of the lobes of the microphone array 300 because these locations may be where talkers and other desirable audio sources are expected to be positioned in the environment.

At step 602, the location of the microphone array 300 in a coordinate system relative to the camera 212 may be received at the camera 212, such as from the microphone array 300. At step 604, the camera 212 may receive from the microphone array 300 the locations of lobes of the microphone array 300 and activity information related to the lobes of the microphone array 300. The lobe activity information may indicate which of the lobes of the microphone array 300 is active (e.g., has audio activity), and may indicate whether the lobe is gated (e.g., suppressed) or not.

At step 606, the camera 212 may generate one or more camera presets, based on the location of the microphone array 300 and the locations of the lobes of the microphone array 300, as received at steps 602 and 604. The camera presets may include, for example, values for the pan, tilt, and zoom parameters of a PTZ camera, and/or values for cropping and zooming of images and video captured by a virtual PTZ camera. At step 608, the camera 212 may determine which camera preset to utilize for capturing images and video, based on the lobe activity information received at step 404. In particular, the lobe activity information may indicate which lobe is active, which may include the lobes where talkers and other desirable audio sources have been detected. For example, the camera 212 may use the camera preset for an active lobe (as derived from the lobe activity information), and therefore capture images and/or video of a desired audio source at that location.

Figure 7:
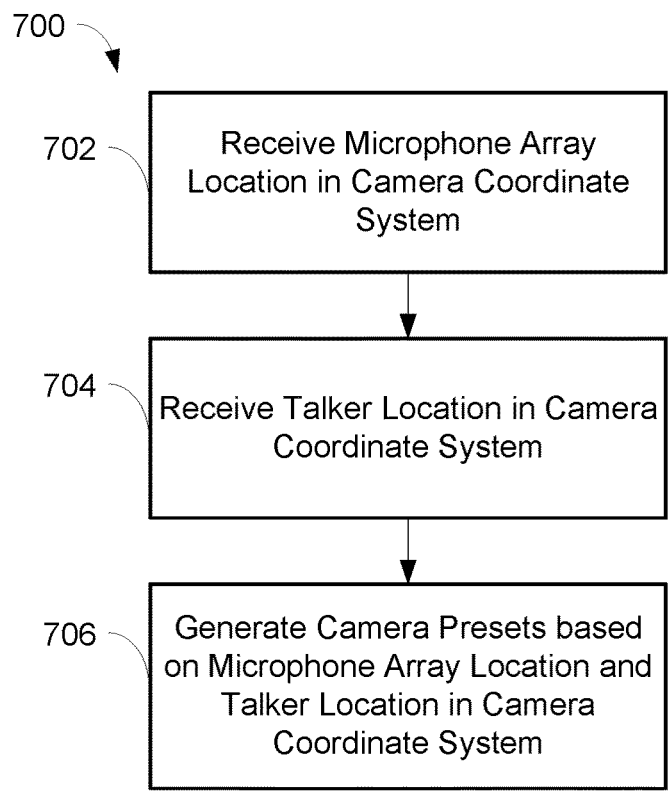
FIG. 7 is a flowchart illustrating operations for generating camera presets using a camera based on a microphone array location and talker locations in a converted coordinate system using the systems of FIGS. 2 and 3, in accordance with some embodiments.

FIG. 7 shows a process 700 for a camera, e.g., camera 212, to generate camera presets based on a microphone array location and talker locations that are in a coordinate system relative to the camera. In addition to or in lieu of utilizing the locations of lobes, it may be beneficial in some scenarios for a camera to also obtain and utilize the locations of talkers to individually frame and/or obtain close-ups of talkers, for example. In embodiments, a microphone array 300 may have converted the locations of the microphone array 300 and the talkers from a coordinate system relative to the microphone array 300 to the coordinate system relative to the camera 212. Camera presets may correspond to specific views of the camera 212, such as a view of a particular location and/or a zoom setting that would capture a portion of the environment where the camera 212 is situated. For example, the camera presets generated by the process 700 may be set to capture images and/or video of one or more of the locations of talkers and other desirable audio sources that have been detected by the microphone array 300.

At step 702, the location of the microphone array 300 in a coordinate system relative to the camera 212 may be received at the camera 212, such as from the microphone array 300. At step 704, the location of a talker in a coordinate system relative to the camera 212 may be received at the camera 212 from the microphone array 300. At step 706, the camera 212 may generate one or more camera presets, based on the location of the microphone array 300 and the locations of the talkers detected by the microphone array 300. The camera 212 may proceed to use the camera preset to capture images and video of the active talker. In embodiments where there are multiple cameras in an environment, images and video of the location of the most recent talker may be captured by a camera 212, based on the location of the most recent talker as denoted by the location of the talker received at step 704.

Figure 8:
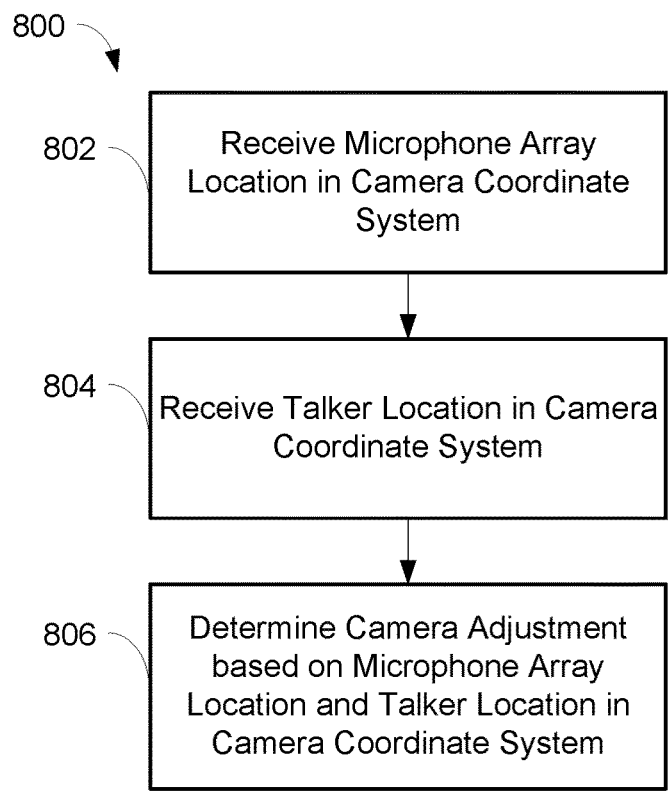
FIG. 8 is a flowchart illustrating operations for determining camera adjustments based on a microphone array location and talker locations in a converted coordinate system using the systems of FIGS. 2 and 3, in accordance with some embodiments.

FIG. 8 shows a process 800 for a camera, e.g., camera 212, to determine adjustments to parameters associated with the camera, based on a microphone array location and talker locations that are in a coordinate system relative to the camera. In embodiments, the parameters of the camera may be adjusted to alter images and/or video captured by the camera, based on the locations of talkers to individually frame and/or obtain close-ups of talkers, for example. In embodiments, a microphone array 300 may have converted the locations of the microphone array 300 and the talkers from a coordinate system relative to the microphone array 300 to the coordinate system relative to the camera 212. The adjustments to the parameters associated with the camera may include, for example, adjustments to an angle, a tilt, a zoom, or a framing of the images and/or video.

At step 802, the location of the microphone array 300 in a coordinate system relative to the camera 212 may be received at the camera 212, such as from the microphone array 300. At step 804, the location of a talker in a coordinate system relative to the camera 212 may be received at the camera 212 from the microphone array 300. At step 806, the camera 212 may generate one or more adjustments to parameters associated with the camera, based on the location of the microphone array 300 and the locations of the talkers detected by the microphone array 300. The camera 212 may proceed to control and adjust the parameters of the camera to alter the images and/or videos captured by the camera 212. For example, the camera 212 may be controlled to crop and zoom the image and/or video captured by the camera 212 to obtain a close-up of the talker.

Figure 9:
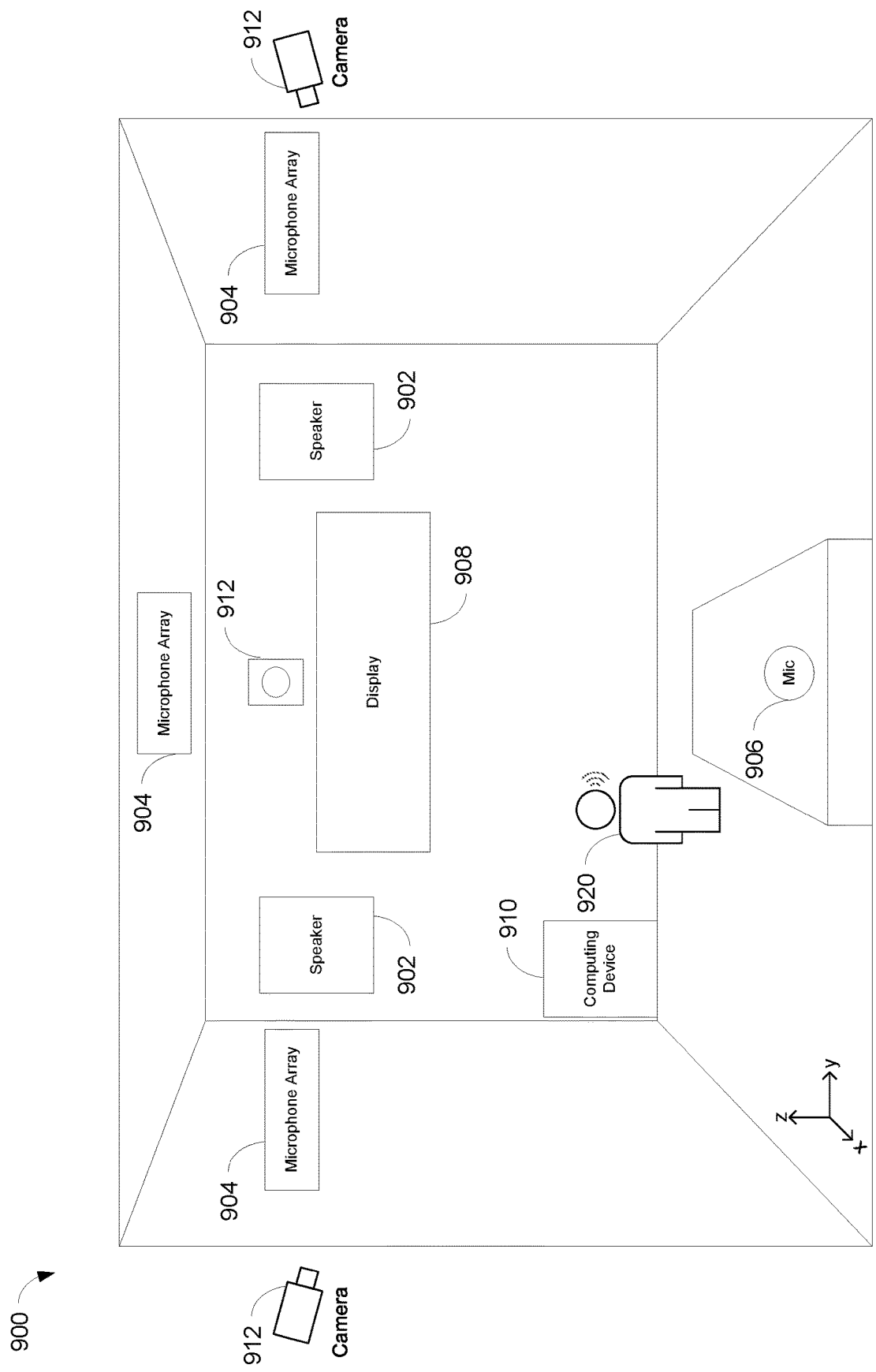
FIG. 9 is an exemplary depiction of a physical environment including a conferencing system including multiple microphone arrays and cameras, in which the system can be utilized to detect and convert the locations of objects and talkers in an environment into a coordinate system, in accordance with some embodiments.

FIG. 9 is an exemplary depiction of a physical environment 900 in which the systems and methods disclosed herein may be used. In particular, FIG. 9 shows a perspective view of an exemplary conference room including various transducers and devices of a conferencing system, as well as other objects. It should be noted that while FIG. 9 illustrates one potential environment, it should be understood that the systems and methods disclosed herein may be utilized in any applicable environment, including but not limited to offices, huddle rooms, theaters, arenas, music venues, etc. The environment 900 may include loudspeakers 902, multiple microphone arrays 904, a tabletop microphone 906, a display 908, a computing device 910, and multiple cameras 912. The environment 900 may also include one or more persons 920 and/or other objects (e.g., musical instruments, phones, tablets, computers, HVAC equipment, etc.). In embodiments, one or more of the components may include a digital signal processor, wireless receivers, wireless transceivers, etc.

It should be understood that the components shown in FIG. 9 are merely exemplary, and that any number, type, and placement of the various components in the environment 900 are contemplated and possible. The environment 900 may be similar to the environment 100 of FIG. 1 as described above, except that there are multiple microphone arrays 904 and multiple cameras 912. For simplicity, descriptions of the functions of the other components shown in the environment 900 are not be repeated here.

The environment 900 shown in FIG. 9 may include a microphone array 904 located on the ceiling and two microphone arrays 904 located on the walls. The use of multiple microphone arrays 904 may improve the sensing and capture of sounds from audio sources in the environment 900. The environment 900 may also include a camera 912 located at the front and two cameras 912 located on the walls. The use of multiple cameras 912 may enable the capture of more and varied types of images and/or video of the environment 900. For example, the camera 912 located at the front may be utilized to capture a wider view of the environment 900, and the cameras 912 on located on the walls may be utilized for capturing close-ups of talkers in the environment.

Figure 10:
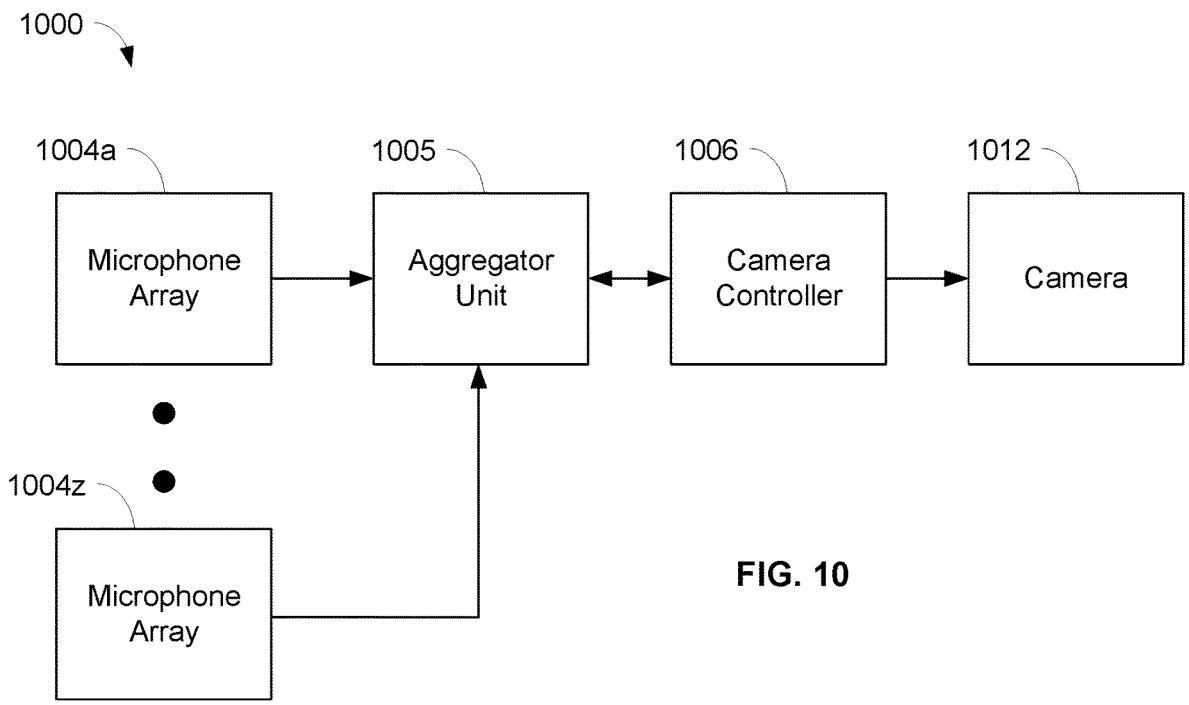
FIG. 10 is a block diagram of a system with multiple microphone arrays that may be usable with the conferencing system of FIG. 9, in accordance with some embodiments.

FIG. 10 shows a block diagram of a system 1000 that is usable with the conferencing system shown in the environment 900 of FIG. 9. The system 1000 may include multiple microphone arrays 1004a, . . . , z (e.g., microphone arrays 904 of FIG. 9) that can detect the locations of objects and talkers in the environment 900, well as an aggregator unit 1005 that can receive the locations and convert the locations into a common coordinate system that is readily usable by a camera 1012 (e.g., camera 912 of FIG. 9) that may be controlled by a camera controller 1006, in embodiments. The aggregator unit 1005 may provide the converted locations to the camera controller 1006 and/or the camera 1012. In embodiments, one of the microphone arrays 1004a, . . . , z may act as the aggregator unit. The camera controller 1006 may provide appropriate signals to the camera 1012 to cause the camera 1012 to move and/or zoom, for example. In some embodiments, the camera controller 1006 and the camera 1012 may be integrated together. The components of the system 1000 may be in wired and/or wireless communication with the other components of the system 1000.

Each microphone array 1004*a*, . . . , *z* may detect and capture sounds from audio sources within an environment. For example, each microphone array 1004*a*, . . . , *z* may detect a sound associated with the camera 1012 and determine the location of the camera 1012 in a coordinate system with respect to itself, e.g., where each microphone array 1004*a*, . . . , *z* is the origin of its respective coordinate system. Each microphone array 1004*a*, . . . *z* may transmit the location of the camera 1012 in its respective coordinate system to the aggregator unit 1005. Each microphone array 1004*a*, . . . *z* may also transmit the locations of its lobes in its respective coordinate system to the aggregator unit 1005.

As another example, each microphone array 1004*a*, . . . , *z* may detect a sound associated with a talker (or other desired audio source) in the environment and determine the location of the talker in its respective coordinate system. Each microphone array 1004*a*, . . . , *z* may transmit the location of the talker in its respective coordinate system to the aggregator unit 1005.

The aggregator unit 1005 may therefore receive, from each microphone array 1004*a*, . . . , *z*: (1) a location of the camera 1012, (2) the lobe locations of each microphone array 1004*a*, . . . z, and/or (3) a location of a talker. The locations received by the aggregator unit 1005 may be in respective coordinate systems of each microphone array 1004*a*, . . . z. The aggregator unit 1005 may convert the location of the camera 1012 from each microphone array 1004*a*, . . . , *z* (that are in respective coordinate systems) into a location of each microphone array 1004*a*, . . . , *z* in the coordinate system with respect to the camera 1012. The aggregator unit 1005 may also convert the locations of the lobes and talkers into the coordinate system with respect to the camera 1012. The aggregator unit 1005 can transmit the converted locations to the camera controller 1006 and/or the camera 1012, such as in response to a query over a suitable application programming interface (API). The camera controller 1006 may utilize the locations of the microphone arrays 1004*a*, . . . , *z*, lobes, and/or talkers that are in the coordinate system with respect to the camera 1012 in order to, for example, generate optimized camera presets to allow more accurate zooming, panning, and/or framing of the talkers.

Figure 11:
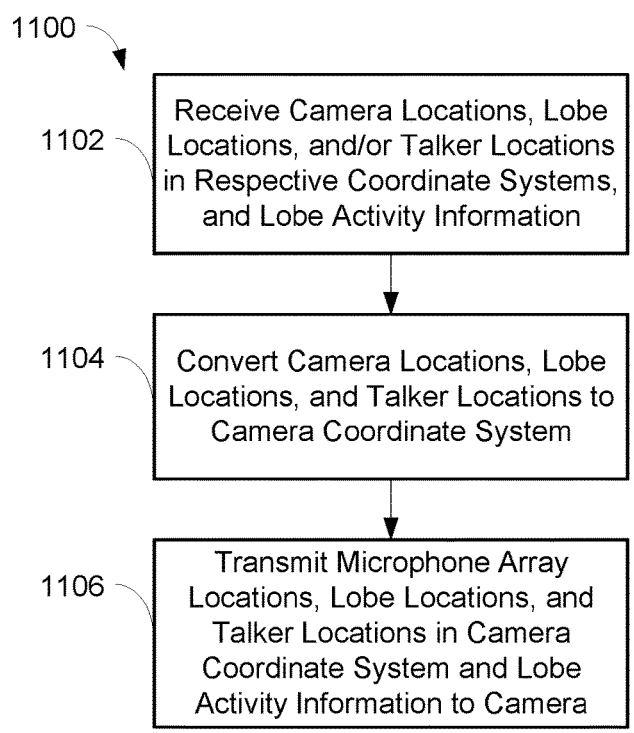
FIG. 11 is a flowchart illustrating operations for aggregating and converting camera locations, lobe locations, and talker locations from multiple microphone arrays in respective coordinate systems into a coordinate system that is usable with the system of FIG. 10, in accordance with some embodiments.

FIG. 11 shows a process 1100 for aggregating and converting camera, lobe locations, and talker locations from multiple microphone arrays that are in respective coordinate systems into a common coordinate system. In embodiments, the process 1100 may be performed by an aggregator unit (e.g., aggregator unit 1005) that collects the camera locations, lobe locations, and talker locations from the multiple microphone arrays. In other embodiments, the process 1100 may be performed by one of the microphone arrays to collect the camera locations, lobe locations, and talker locations from the other microphone arrays.

The locations of: (1) the camera, (2) lobes of each microphone array, and (3) talkers detected by each microphone array may be in the coordinate system relative to each respective microphone array. The process 1100 may convert the locations from the coordinate system of the respective microphone arrays into a common coordinate system, such as a coordinate system relative to a camera. At step 1102, the locations of the cameras, lobes, and/or talkers may be received from each of the microphone arrays, as well as lobe activity information indicating which lobes of the microphone arrays are active, for example.

At step 1104, the locations of the camera, lobes, and/or talkers may be converted from the coordinate system relative to each respective microphone array into the coordinate system relative to the camera. In particular, the location of the camera in the coordinate system relative to each respective microphone array may be converted into a location of each microphone array with respect to the camera. The locations of the lobes and talkers may be converted from coordinate system relative to each respective microphone array into the coordinate system relative to the camera. At step 1106, the locations of the microphone arrays, lobes, and talkers that are in the coordinate system relative to the camera 212 may be transmitted to the camera 212. The lobe activity information may also be transmitted to the camera 212 at step 1106.

Figure 12:
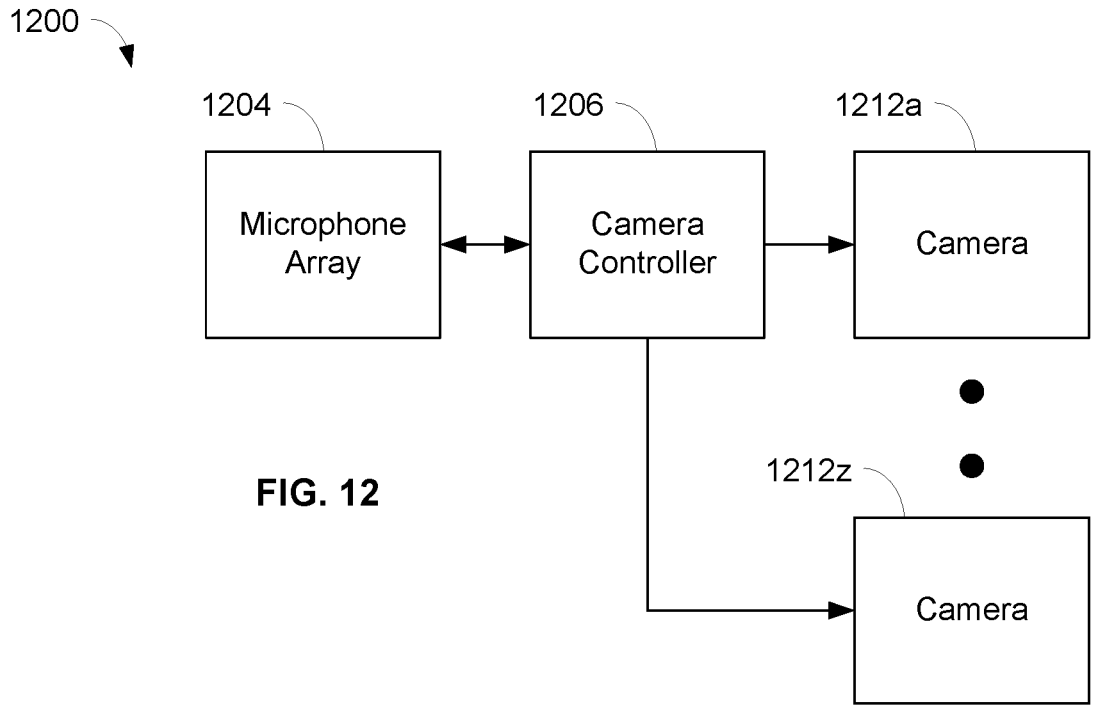
FIG. 12 is a block diagram of a system with multiple cameras that is usable with the conferencing system of FIG. 9, in accordance with some embodiments.

FIG. 12 shows a block diagram of a system 1200 that is usable with the conferencing system shown in the environment 900 of FIG. 9. The system 1200 may include a microphone array 1204 (e.g., microphone array 904 of FIG. 9) that can detect and convert the locations of objects and talkers in the environment 900 into a common coordinate system that is readily usable by one or more cameras 1212*a*, . . . *z* (e.g., camera 912 of FIG. 9). The cameras 1212*a*, . . . , *z* can capture images and/or video of the environment 900.

A camera controller 1206 may receive the locations of the microphone array 1204, lobes of the microphone array 1204, and talkers, where the locations have been converted into a common coordinate system by the microphone array 1204. The camera controller 1206 may select which of the cameras 1212*a*, . . . , *z* to utilize for capturing images and/or video of a particular location, e.g., where an active talker is located. The selection by the camera controller 1206 of the camera 1212*a*, . . . , *z* to utilize may be based on one or more of the received locations of the microphone array 1204, lobes of the microphone array 1204, and talkers. The camera controller 1206 may also provide appropriate signals to the cameras 1212*a*, . . . , *z* to cause the cameras 1212*a*, . . . , *z* to move and/or zoom, for example. The components of the system 1200 may be in wired and/or wireless communication with the other components of the system 1200.

Figure 13:
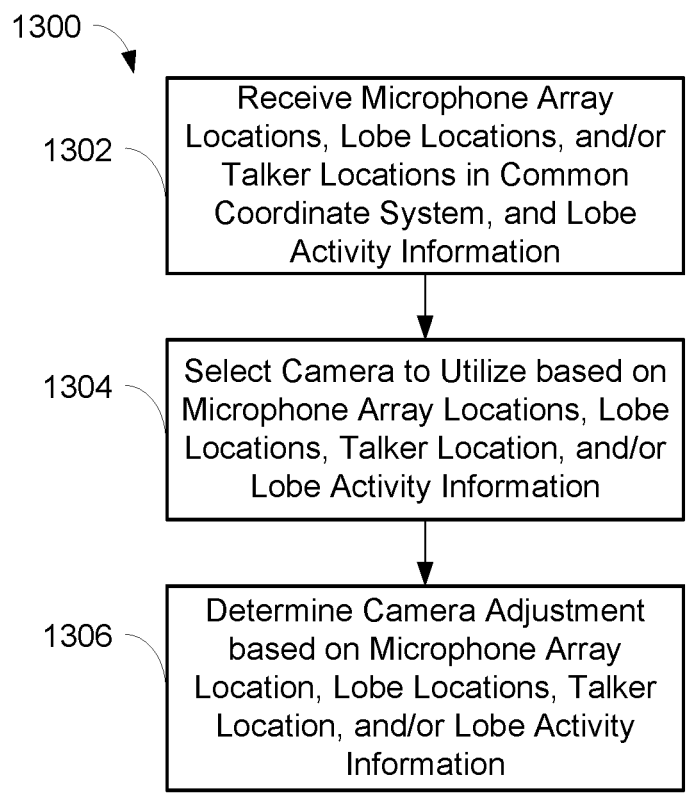
FIG. 13 is a flowchart illustrating operations for selecting a camera to utilize and for adjusting the selected camera that is usable with the system of FIG. 12, in accordance with some embodiments.

FIG. 13 shows a process 1300 for a camera controller, e.g., camera controller 1206, to select a camera, e.g., camera 1212*a*, . . . , *z*, and determine adjustments to parameters associated with the camera, based on a microphone array location, lobe locations, and/or talker locations that are in common coordinate system. The camera controller 1206 may also utilize lobe activity information from the microphone array 1204. The adjustments to the parameters associated with the camera may include, for example, adjustments to an angle, a tilt, a zoom, or a framing of the images and/or video.

At step 1302, the camera controller 1206 may receive one or more of the location of the microphone array 1204, the locations of lobes of the microphone array 1204, and/or the location of a talker that has been detected by the microphone array 1204. Lobe activity information may also be received by the camera controller 1206 at step 1302. The locations received at step 1302 may be in a common coordinate system that is usable by all of the cameras 1212*a*, . . . , *z*. For example, the common coordinate system may be relative to one of the cameras 1212*a*, . . . , *z* (e.g., a camera at the front of a room), or may be relative to a specific part of a room (e.g., a corner of the room).

At step 1304, the camera controller 1206 may select one of the cameras 1212*a*, . . . , *z* to utilize, based on the locations and/or lobe activity information received at step 1302. For example, the camera 1212*a*, . . . , *z* that is selected may be the camera 1212a, . . . , *z* closest to an active talker, the camera 1212a, . . . , *z* that is already zoomed in on the active talker, or the camera 1212a, . . . , *z* that can best be utilized to capture the face of the active talker. At step 1306, the camera controller 1206 may generate one or more adjustments to camera selected at step 1304, based on the locations and/or lobe activity information received at step 1302. The camera controller 1206 may proceed to control and adjust the parameters of the selected camera 1212a, . . . , *z* to alter the images and/or videos captured by the camera 1212a, . . . *z*.

In embodiments, one or more of the cameras 1212a, . . . , *z* may detect a microphone array 1204 and determine the location of the microphone array 1204 in the coordinate system with respect to each of the cameras 1212a, . . . , *z*. For example, the cameras 1212a, . . . , *z* may utilize image recognition techniques, artificial intelligence techniques, and/or visual indicators or markers to detect the location of the microphone array 1204. Based on the locations of the microphone array 1204 in each respective camera coordinate system, the location of the microphone array 1204 may be determined, such as by converting the locations of the microphone array 1204 in each respective camera coordinate system into the location of the microphone array 1204 in a common coordinate system that is known to all of the cameras 1212a, . . . , *z*. A parameter of one or more of the cameras 1212a, . . . , *z* may be adjusted and controlled to capture desired images and/or video, based on the location of the microphone array 1204 in the common coordinate system.

The description herein describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method, comprising:
determining, using a microphone array and based on received audio comprising an acoustic trigger from or near a location of a camera, a location of the camera in a first coordinate system;
setting and transmitting an origin of a second coordinate system from the camera to the microphone array, based on the camera being pointed at a location of the microphone array,
converting, using the microphone array, the location of the camera in the first coordinate system into a location of the microphone array in a second coordinate system; and
transmitting, from the microphone array to the camera, the location of the microphone array in the second coordinate system.

2. The method of claim 1, wherein determining the location of the camera comprises determining the location of the received audio using an audio localization algorithm.

3. The method of claim 1, wherein transmitting the location of the microphone array in the second coordinate system from the microphone array to the camera causes the camera to adjust at least one parameter.

4. The method of claim 1:
wherein the first coordinate system comprises a coordinate system with respect to the microphone array; and
wherein the second coordinate system comprises a coordinate system with respect to the camera.

5. The method of claim 1, further comprising:
converting, using the microphone array, a lobe location of the microphone array in the first coordinate system into a lobe location of the microphone array in the second coordinate system; and
transmitting, from the microphone array to the camera, the lobe location of the microphone array in the second coordinate system.

6. The method of claim 5, further comprising automatically generating one or more presets of the camera in the second coordinate system, based on the lobe location of the microphone array in the second coordinate system.

7. The method of claim 1, further comprising:
determining, using the microphone array and based on audio associated with a talker, a location of the talker in the first coordinate system;
converting, using the microphone array and based on the location of the talker in the first coordinate system, the location of the talker into a location of the talker in the second coordinate system; and transmitting, from the microphone array to the camera, the location of the talker in the second coordinate system.

8. The method of claim 1, further comprising:
controlling the camera to point at the microphone array; and
setting an origin of the second coordinate system based on: (1) the location of the first microphone array in the second coordinate system and (2) an image from the camera.

9. A system, comprising:
a microphone array; and
a camera that is not co-located with the microphone array;
wherein the microphone array is configured to:
determine a location of the camera in a first coordinate system that is relative to the microphone array, based on localization of an acoustic trigger from or near a location of the camera; and
convert the location of the camera in the first coordinate system into a location of the microphone array in a second coordinate system that is relative to the camera; and
wherein the camera is configured to set and transmit an origin of the second coordinate system from the camera to the microphone array, based on the camera being pointed a location of the microphone array.

10. The system of claim 9, wherein the microphone array is further configured to transmit the location of the microphone array in the second coordinate system to the camera to cause the camera to adjust at least one parameter.

11. The system of claim 9, wherein the microphone array is further configured to:
convert a lobe location of the microphone array in the first coordinate system into a lobe location of the microphone array in the second coordinate system; and
transmit, from the microphone array to the camera, the lobe location of the microphone array in the second coordinate system.

12. The system of claim 11, wherein the camera is configured to generate one or more presets of the camera in the second coordinate system, based on the lobe location of the microphone array in the second coordinate system.

13. The system of claim 9, wherein the microphone array is further configured to:
determine a location of a talker in the first coordinate system based on audio associated with the talker;
convert the location of the talker into a location of the talker in the second coordinate system, based on the location of the talker in the first coordinate system; and
transmit, from the microphone array to the camera, the location of the talker in the second coordinate system.

14. The system of claim 9, wherein the camera is configured to:
control the camera to point at the microphone array; and
set an origin of the second coordinate system based on: (1) the location of the microphone array in the second coordinate system and (2) an image from the camera.

15. A system, comprising:
a microphone array configured to:
detect a location of a camera in a first coordinate system based on an acoustical trigger from or near the camera;
convert the location of the camera in the first coordinate system into a location of the microphone array in a second coordinate system; and
transmit, to the camera, the location of the microphone array in the second coordinate system; and
the camera configured to:
set and transmit an origin of the second coordinate system to the microphone array, based on the camera being pointed at the location of the microphone array;
receive the location of the microphone array in the second coordinate system;
automatically generate, based on the location of the microphone array, one or more camera presets in the second coordinate system; and
adjust a parameter of the camera based on the one of the one or more camera presets.

16. The system of claim 15, wherein the camera is further configured to:
be controlled to point the camera at the microphone array; and
set an origin of the second coordinate system based on: (1) the location of the microphone array in the second coordinate system and (2) an image from the camera.

* * * * *